(12) United States Patent
Abe et al.

(10) Patent No.: US 6,589,893 B2
(45) Date of Patent: Jul. 8, 2003

(54) GLASS-CERAMICS HAVING HEXACELSIAN AS A PRIMARY CRYSTAL PHASE, MAGNETIC DISK SUBSTRATE AND MAGNETIC DISK

(75) Inventors: Masahiro Abe, Nagoya (JP); Takahiro Takahashi, Nagoya (JP); Fuminori Takeya, Nagoya (JP); Atsushi Watanabe, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 101 days.

(21) Appl. No.: 09/821,959

(22) Filed: Mar. 30, 2001

(65) Prior Publication Data

US 2001/0041657 A1 Nov. 15, 2001

(30) Foreign Application Priority Data

Apr. 11, 2000 (JP) ........................................ 2000-109590
Oct. 3, 2000 (JP) ........................................ 2000-303810

(51) Int. Cl.⁷ .............................................. C03C 10/06
(52) U.S. Cl. ........................ 501/8; 501/69; 428/694 ST
(58) Field of Search ................................ 501/8, 69, 70; 428/694 ST

(56) References Cited

U.S. PATENT DOCUMENTS

| 4,959,330 A | * | 9/1990 | Donohue et al. ............... 501/8 |
| 5,786,286 A | | 7/1998 | Kohli ............................. 501/8 |
| 5,910,459 A | | 6/1999 | Beall et al. ..................... 501/8 |

FOREIGN PATENT DOCUMENTS

| JP | 8-169724 A | 7/1996 |
| JP | 9-012333 A | 1/1997 |

* cited by examiner

*Primary Examiner*—Karl Group
(74) *Attorney, Agent, or Firm*—Burr & Brown

(57) ABSTRACT

A glass-ceramic has a hexacelsian as a primary crystal phase and is characterized by satisfying a relation of $0 \leq I(101)/I(110) \leq 1.5$ when a diffraction intensity of (101) face of hexacelsian in an X-ray diffraction is I(101) and a diffraction intensity of (110) face thereof is I(110).

15 Claims, 5 Drawing Sheets

(1 of 5 Drawing Sheet(s) Filed in Color)

Example 2        50nm 400,000        100,000

Comparative Example 5

50nm 400,000   100,000

GLASS-CERAMICS HAVING HEXACELSIAN AS A PRIMARY CRYSTAL PHASE, MAGNETIC DISK SUBSTRATE AND MAGNETIC DISK

BACKGROUND OF THE INVENTION

1. Field of the Invention

This invention relates to a glass-ceramic having hexacelsian as a primary crystal phase and a magnetic disk substrate using the same.

2. Description of Related Art

Recently, a chemically strengthened glass and a glass-ceramic containing lithium disilicate as a primary crystal phase are used as a magnetic disk substrate. In the case of lithium disilicate glass-ceramics, lithium may diffuse at an end portion of a thin substrate from the substrate through an under-coat, a magnetic film and a protection film and react with a lubrication film.

And also, an alkali-free glass-ceramic is proposed for improving a weather resistance of a glass substrate. In the alkali-free glass-ceramic, however, the polishing with cerium oxide is difficult because the polishing rate is extremely low.

For example, U.S. Pat. Nos. 5,786,286 and 5,910,459 disclose that a glass-ceramic having hexacelsian as a primary crystal phase is used as a magnetic disk substrate. Since hexacelsian is large in the thermal expansion and alkali-free, it is effective to realize the thermal expansion required as the magnetic disk substrate by using such a glass-ceramic. However, such a substrate is not put into practical use due to abnormal expansion accompanied with phase transformation up to now.

In the above two patents, there is disclosed that the abnormal expansion accompanied with the phase transformation of hexacelsian is removed by specifying the glass composition. However, the glass-ceramic is subjected to polishing finish with abrasive grains of aluminum oxide for preparing the magnetic disk substrate. Because, the glass-ceramic is hard and is too low in the polishing rate for abrasive grains of cerium oxide widely used in the polishing industry for the glass substrates (that is, it is impossible to polish with the cerium oxide grains). As described, for example, on column 11, lines 54 to 55 of the above U.S. Pat. No. 5,910,459, the glass-ceramic is subjected to a finishing treatment of lapping with 7 $\mu$m alumina slurry and then polishing with 1.5 $\mu$m alumina polishing slurry because the hardness of the alumina grain is considerably higher than that of cerium oxide grain.

SUMMARY OF THE INVENTION

It is, therefore, an object of the invention to provide a glass-ceramic having a high weather-resistance hexacelsian as a primary crystal phase and further having a high polishing rate capable of polishing at a sufficiently practical rate with abrasive grains of types usually used in industry such as cerium oxide and the like.

It is another object of the invention to provide a magnetic disk substrate made of the above glass-ceramic and having a face of small center-line average surface roughness Ra and excellent characteristics from a viewpoint of thermal expansion coefficient.

According to a first aspect of the invention, there is provision of a glass-ceramic having a hexacelsian as a primary crystal phase, characterized by satisfying a relation of $0 \leq I(101)/I(110) \leq 1.5$ when a diffraction intensity of (101) face of hexacelsian in an X-ray diffraction is I(101) and a diffraction intensity of (110) face thereof is I(110).

According to a second aspect of the invention, there is the provision of a glass-ceramic characterized by ceramming a precursor glass comprising 43–57 mol % of $SiO_2$, 7–15 mol % of $Al_2O_3$, 13–21 mol % of MgO, 4–12 mol % of BaO, 2–6 mol % of $K_2O$ and 5–9 mol % of $TiO_2$ through a heat treatment.

According to a third aspect of the invention, there is the provision of a magnetic disk substrate made of the above glass-ceramic.

BRIEF DESCRIPTION OF THE DRAWINGS

The file of this patent contains at least one drawing or photograph executed in color. Copies of this patent with color drawing(s) or photograph(s) will be provided by the Patent and Trademark Office upon request and payment of the necessary fee.

The invention will be described with reference to the accompanying drawings, wherein.

DETAILED DESCRIPTION OF THE INVENTION

Figure 1:
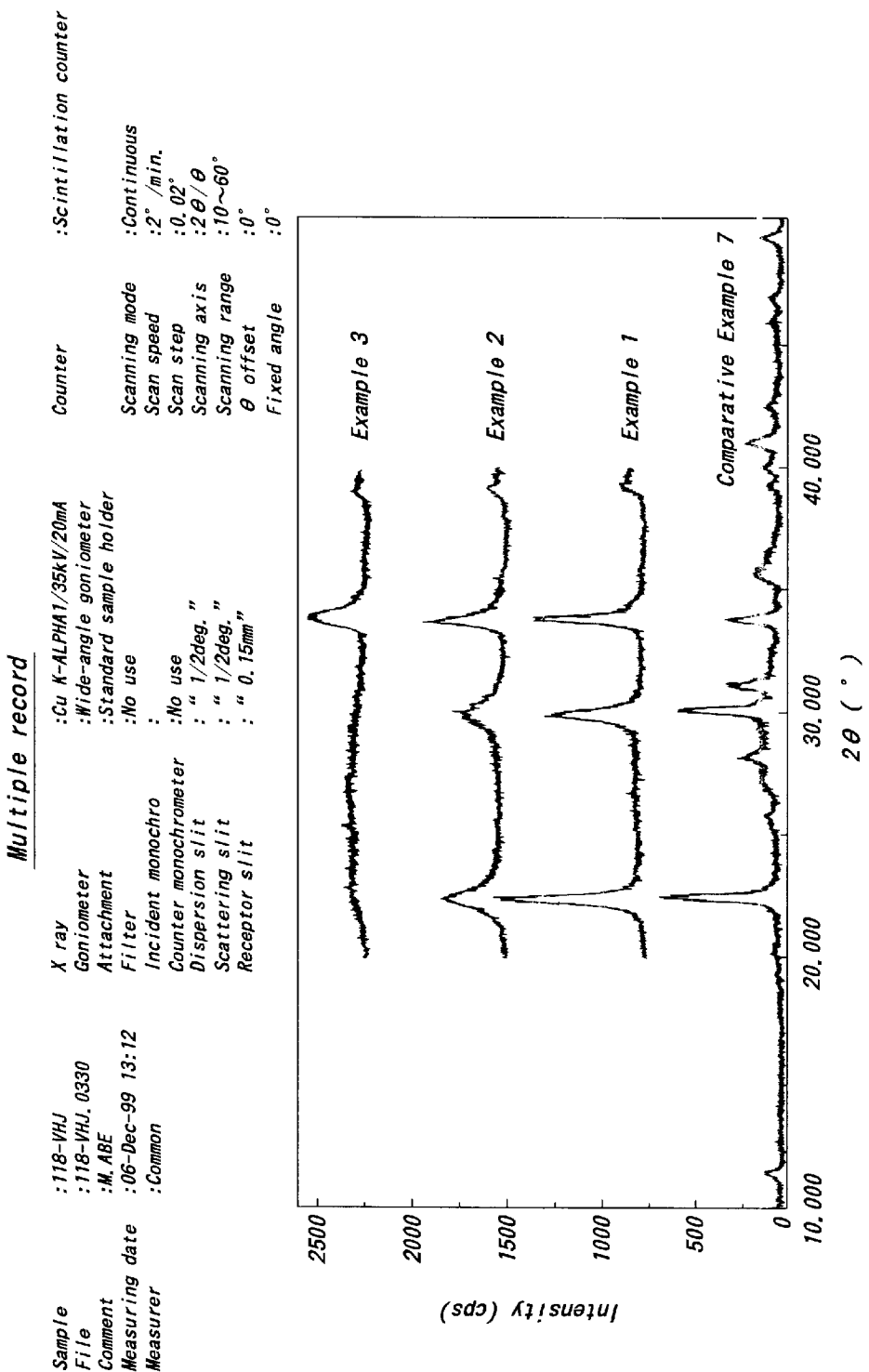
FIG. 1 is an X-ray diffraction chart for samples of Examples 1–3 and Comparative Example 7.

The inventors have found that a glass-ceramic having a crystal growing a particular crystal face of hexacelsian as a primary crystal phase is obtained by adding $K_2O$ to a precursor glass of $SiO_2$—$Al_2O_3$—MgO—BaO—$TiO_2$ system and ceramming them. As a result of examination on such a glass-ceramic, it has been discovered to have the following characteristics.

(1) Since lithium is not contained, a high weather resistance is maintained.

(2) The abnormal expansion accompanied with phase transformation of hexacelsian is controlled.

(3) The polishing rate is considerably high as compared with the conventional glass-ceramic having usual hexacelsian as a primary crystal phase, so that it is possible to conduct the polishing at a proper rate with abrasive grains usually used in industry. For example, the polishing with abrasive grains of cerium oxide can be conducted at the same rate as in the conventional glass-ceramic having lithium disilicate as a primary crystal phase.

It has been found that a particular face in diffraction peaks known as hexacelsian is grown as a result of an X-ray diffraction on the glass-ceramic obtained by adding potassium to a glass composition, wherein hexacelsian is rendered into a primary crystal in the ceramming, and then ceramming them at 850° C. That is, diffraction intensities of (101) and (102) faces, which were naturally large in the X-ray diffraction, become small, while diffraction intensity of (110) face perpendicular to C-axis becomes large. This suggests that crystal grains grow in form of a sheet. Hexacelsian is known to indicate cleavage at a face perpendicular to C-axis or (110) face. Therefore, it is considered that the large polishing rate for the abrasive grains of cerium oxide is obtained owing to the growth of easily cleavable (110) face.

When the glass-ceramic having lithium disilicate as a primary crystal phase is used as a material for a magnetic disk substrate as mentioned above, if a media consisting of an undercoat, a magnetic film, a protection film and a lubrication film successively sputtered onto the glass substrate is left to stand under high temperature and high humidity conditions for a long time, a corrosion product may be observed about inner and outer peripheral portions of the media. As an analytical result of the corrosion product, lithium is observed in addition to the lubrication film component. On the other hand, when potassium is included in the inside of the glass substrate as in the invention, potassium is not observed from the corrosion product. Therefore, in order to improve the weather resistance of the media, it is important to exclude lithium from the glass composition, while the presence of potassium in the glass is considered to be no problem from a viewpoint of the weather resistance.

In U.S. Pat. No. 5,910,459 are shown X-ray diffraction patterns of two samples of the glass-ceramic having hexacelsian as a primary crystal phase. According to this patent, when diffraction intensity of (101) face of hexacelsian is I(101) and diffraction intensity of (110) face thereof is I(110), a ratio I(101)/I(110) is 2.5 in both samples. And also, these samples have I(101)/I(110) of 2.4 in JCPDS card No. 260137. From these facts, hexacelsian crystal included in the glass-ceramic of the above patent is considered to be typical and does not indicate the growth of a particular crystal face.

That is, the above patent does not mention the growth of the particular crystal face in hexacelsian and the improvement of the polishing rate by the addition of $K_2O$ at all. And also, this patent discloses on column 5, lines 10–13 that alkali metal ions may be added to the composition but generally decrease durability and increase the propensity for contamination of magnetic film, so that the addition of the alkali metal is unfavorable. Especially, this patent does not recognize the improvement of the polishing rate by the addition of potassium oxide at all.

On the other hand, JP-A-8-169724 and JP-A-9-12333 disclose alkali-free glasses containing BaO, respectively. However, these glasses are not a glass-ceramic and different from a glass aiming at the invention.

In the invention, the ratio I(101)/I(110) is favorable to be not more than 1.2.

In the precursor glass according to the invention, the amount of $SiO_2$ is preferably not less than 45 mol % but not more than 55 mol %. The amount of $Al_2O_3$ is preferably not less than 8 mol % but not more than 14 mol %. The amount of MgO is preferably not less than 14 mol % but not more than 20 mol %. The amount of CaO is preferably within a range of 0–6 mol %. The amount of BaO is preferably not less than 5 mol % but not more than 11 mol %. The amount of $K_2O$ is preferably not less than 3 mol % but not more than 5 mol %. The amount of $TiO_2$ is preferably not less than 6 mol % but not more than 8 mol %.

Moreover, at least one of $ZrO_2$, $Sb_2O_3$, ZnO, $SnO_2$, $As_2O_3$, $B_2O_3$ and a fluoride of a noble metal may be included in the precursor glass.

In a preferable embodiment of the invention, a devitrification temperature in the melting of the precursor glass is not higher than 1280° C. and a viscosity log η (poise) in the devitrification is not less than 2.8. Thus, there can be adopted a direct press method widely used as a method for the production of a magnetic disk substrate.

In the direct press method used in the production of the magnetic disk substrate, the precursor glass is melted to form a viscous molten lump called as "gob" and then the molten lump is shaped into a flat disk by direct pressing. In this method, it is required that (1) the melt is pressed at an operating temperature somewhat higher than the devitrification temperature, and (2) the melt has a certain high viscosity at such an operating temperature. In general, as the devitrification temperature of the melt of the precursor glass becomes higher, the viscosity of the melt at the operating temperature lowers.

It has been found that in the glass-ceramic according to the invention, the devitrification temperature is usually high and is often not lower than 1300° C. As the devitrification temperature of the melt of the precursor glass becomes not lower than 1300° C., the devitrification viscosity log η (poise) is as low as about 2.5. As a result, the viscosity of the melt at the operating temperature somewhat higher than the devitrification temperature becomes lower than the devitrification viscosity. For this end, it is difficult to stably conduct the direct press method.

In the glass-ceramic according to the invention, therefore, the devitrification temperature in the melting of the precursor glass is restricted to not higher than 1280° C., and the viscosity in the devitrification log η (poise) is restricted to not less than 2.8, whereby it is made possible to conduct the direct press method for the production of, for example, magnetic disk substrates.

The glass-ceramic according to the invention is favorable to have the following composition:

$SiO_2$: 43–57 mol %
$Al_2O_3$: 7–15 mol %
MgO: 13–21 mol %
BaO: 4–12 mol %
$K_2O$: 2–6 mol %
$TiO_2$: 5–9 mol %
CaO: 0–6 mol %
$B_2O_3$: 0–5 mol %
$P_2O_5$: 0–5 mol %
$Bi_2O_5$: 0–5 mol %
($CaO+B_2O_3+P_2O_5+Bi_2O_5$): 0.3–6 mol %

In the glass-ceramic according to the invention, one or more oxides selected from the group consisting of CaO, $B_2O_3$, $P_2O_5$ and $Bi_2O_5$ is included and a total amount of these oxides is made to 0.3–6 mol %, whereby the devitrification temperature in the melting of the precursor glass can be lowered, preferably be not higher than 1280° C., and the viscosity in the devitrification log η (poise) can be made to not less than 2.8.

When the amount of CaO exceeds 6 mol %, the amount of hexacelsian precipitated becomes small and the crystal grains tend to become coarse. In this connection, it is further preferable to be not more than 5 mol %. On the other hand, the amount of CaO is preferable to be not less than 0.2 mol % from a viewpoint of the lowering of devitrification temperature.

When the amount of $B_2O_3$ exceeds 5 mol %, the chemical durability lowers and the crystal grains tend to become coarse. In this connection, it is further preferable to be not more than 4 mol %. On the other hand, the amount of $B_2O_3$ is preferable to be not less than 0.2 mol % from a viewpoint of the lowering of devitrification temperature.

When the amount of $P_2O_5$ exceeds 5 mol %, the chemical durability lowers and the crystal grains tend to become coarse. In this connection, it is further preferable to be not more than 4 mol %. On the other hand, the amount of $P_2O_5$ is preferable to be not less than 0.2 mol % from a viewpoint of the lowering of devitrification temperature.

When the amount of $Bi_2O_5$ exceeds 5 mol %, the chemical durability lowers and the crystal grains tend to become coarse. In this connection, it is further preferable to be not more than 4 mol %. On the other hand, the amount of $Bi_2O_5$ is preferable to be not less than 0.2 mol % from a viewpoint of the lowering of devitrification temperature.

In the composition system according to the invention, the amount of $SiO_2$ is preferably not less than 45 mol % but not more than 55 mol %. The amount of $Al_2O_3$ is preferably not less than 8 mol % but not more than 14 mol %. The amount of MgO is preferably not less than 14 mol % but not more than 20 mol %. The amount of CaO is preferably 0–6 mol %. The amount of BaO is preferably not less than 5 mol % but not more than 11 mol %. The amount of $K_2O$ is preferably not less than 3 mol % but not more than 5 mol %. The amount of $TiO_2$ is preferably not less than 6 mol % but not more than 8 mol %.

Furthermore, the total amount of ($CaO+B_2O_3+P_2O_5+Bi_2O_5$) is preferably not less than 0.5 mol % but not more than 5 mol %.

The production method of the glass-ceramics according to the invention is not restricted, but can be made as follows.

In the production of the precursor glass, starting materials containing the respective metal atoms are mixed so as to satisfy the above mixing ratio be weight and then melted. As the starting material, mention may be made of oxide, carbonate, nitrate, phosphate and hydroxide of each metal atom. And also, the atmosphere in the ceramming of the precursor glass through heat treatment may be selected from an atmosphere, a reducing atmosphere, a steam atmosphere, a pressurized atmosphere and the like.

In the production of the glass-ceramic according to the invention, a cast molding method wherein the precursor glass is cast into a mold and a direct press method may be used. Particularly, the direct press method is preferable.

A magnetic disk substrate can be produced by subjecting the glass-ceramic as a starting material to so-called lapping or polishing. As an abrasive grain in the polishing, cerium oxide is preferable, but aluminum oxide, zirconium oxide and other well-known abrasive grains may be used. On a main face of the magnetic disk substrate according to the invention may be formed an undercoat, a magnetic film, a protection film and the like, and also a lubricant may be applied onto the protection film.

The following examples are given in illustration of the invention and are not intended as limitations thereof.

Preparation of Precursor Glass

Various compounds containing respective metals are mixed so as to have a given weight ratio of oxides of these metals. 250 g of the resulting mixture is placed in a platinum crucible of 200 cc in capacity and melted by heating at 1450° C. for 6 hours. Thereafter, the melt is cast and molded into a carbon mold. The molded body is annealed at 700° C. for 1 hour and gradually cooled to obtain a disk-like precursor glass. From this precursor glass are cut out four sheet-shaped samples of 15×15×0.85 mm, 5×3×0.85 mm, 5×5×0.85 mm and 4×40×1 mm.

Ceramming

Each sample is cerammed in a nitrogen atmosphere at a state of sandwiching between carbon sheets of 5 mm in thickness. The ceramming is scheduled by raising a temperature up to a given ceramming temperature at a rate of 200° C./h, holding such a temperature for 5 hours and cooling to room temperature at a rate of 200° C./h.

Measurement of Glass Transition Temperature

The sample of 5×30×0.85 mm is cut into a length of 20 mm. The thermal expansion coefficient of the cut sample is measured by an apparatus for measuring thermal expansion coefficient (TD 5030, made by Mac Science) within a range of from room temperature to 900° C. Moreover, such an apparatus is provided with a function automatically stopping the measurement at a time of yielding the glass. With respect to the temperature change, a temperature bending thermal expansion curve of the glass (inflection point) is regarded as a glass transition point.

Identification of Crystal Phase

A crystal phase in a surface of the sheet-shaped sample of 15×15 mm after the ceramming is identified by using an X-ray diffraction device (Gigerflex made by Rigaku Denki Co., Ltd.: tube voltage 30 kV, tube current 20 mA) using $K_\alpha$-ray of copper. In this case, a scanning angle is $2\theta=20–40°$. Each crystal phase has the following JCPDS card.

TABLE 1

| JCPDS card of each crystal phase | | |
| --- | --- | --- |
| Chemical formula | Name | Card No. |
| $BaO-Al_2O_3-2SiO_2$ | celsian | 26-0137 |
| $MgO-SiO_2$ | enstatite | 19-0768 |
| $2MgO-SiO_2$ | forsterite | 34-0189 |
| $CaO-MgO-2SiO_2$ | diopside | 41-1370 |

In each sample, crystals of hexacelsian (chemical formula $BaO.2SiO_2$: JCPDS No. 26-0137), enstatite (JCPDS No. 19-0768), forsterite (JCPDS No. 34-0189), diopside (JCPDS No. 41-1370) and the like are observed as a primary crystal phase. In this case, the primary crystal phase is a crystal phase indicating a largest main peak intensity and a crystal phase having a peak intensity corresponding to not less than a half of the greatest main peak intensity. Moreover, a secondary crystal phase is a crystal phase having a peak intensity corresponding to less than a half of the greatest main peak intensity.

Measurement of Thermal Expansion Coefficient

The sample of 5×30 mm after the ceramming is cut into a length of 20 mm. Then, a thermal expansion coefficient of the cut sample is measured within a range of from −40° C. to 70° C. by using an apparatus for measuring thermal expansion coefficient (TD 5000S, made by Mac Science). The thermal expansion coefficient up to 70° C. based on −40° C. is calculated.

Measurement of Ra on a Smooth Face After Precision Polishing

A disk-shaped glass-ceramic sample after the ceramming is worked to an outer diameter of 65.00 mm and an inner diameter of 20.25 mm and thereafter subjected to a precision grinding up to a sample thickness of 0.685 mm with a fixed grindstone of #1500 diamond. Then, it is subjected to a polishing up to a sample thickness of 0.635 mm under a load of 150 g/cm² with cerium oxide abrasive grains of 1.0–2.0 μm and hard cerium pad through both-side polished disc of 16B. Further, second-stage polishing is carried out with cerium oxide abrasive grains of 0.01–0.5 μm to obtain a precision polished body having a thickness of 0.635 mm.

Then, a center-line average surface roughness (Ra) on the surface of the precision polished body is measured by a tapping mode of an interatomic force microscope (D3100, made by DI) using a silicon cantilever (resonance frequency of 300 kHz).

Observation of Microstructure

A test sample of 5×5 mm is set onto a transmission electron microscope and a position of the test sample to be observed by the microscope is etched by an argon ion beam to a thickness of 10–15 nm. Then, such an etched position is observed at dark field and light field states by using a transmission electron microscope of JEM-2000EX made by Nippon Denshi Co., Ltd. at an acceleration voltage of 200 kV and a magnification of 100,000–400,000.

Measurement of Amount of Alkali Eluted

There is provided a disk-shaped sample (precision polished body) having an outer diameter of 65.00 mm, an inner diameter of 20.25 mm and a thickness of 0.635 mm. The disk-shaped sample is placed in a closed polytetrafluoroethylene container of 300 ml in capacity together with 50 ml of super-pure water. And also, a silicon rod is placed beneath the test sample so as to assist elution from both surfaces of the test sample. Then, the closed container is placed in a clean oven and held at 80° C. for 5 hours to elute alkali into the super-pure water. Thereafter, an amount of alkali eluted in the super-pure water is measured by an atomic absorption spectroscopy.

Measurement of Density

The density is measured according to an Archimedean method by using the sample of 15×15×0.85 mm after the measurement through the X-ray diffraction.

Measurement of Young's Modulus and Bending Strength

There is provided a sample of 4×40×1 mm. After a strain gauge is attached to the sample, a four-point bending test is carried out under conditions of a lower span of 30 mm, an upper span of 10 mm and a cross head speed of 0.5 mm/min to measure a bending strength and a Young's modulus.

Measurement of Vickers Hardness and Fracture Toughness

With respect to the samples after the precision polishing, a Vickers hardness and a fracture toughness are measured at a pushing pressure of 1 kgf by using a micro-Vickers hardness meter.

Devitrification Temperature and Devitrification Viscosity

They are measured by using 400 g of each precursor glass after the melting. The precursor glass is melted by heating at 1450° C. for 6 hours and then the temperature is dropped from 1450° C. at a rate of 3° C./min, during which the measurement is carried out by using a rotational viscosity measuring device (VG-1500, made by Sumita Kogaku Co., Ltd.). In this case, a temperature when the viscosity of the melt is violently raised by the formation of crystal during the temperature dropping is a devitrification temperature (° C.), and a viscosity at such a temperature is a devitrification viscosity log η (poise).

Various experimental results are shown in Tables 2 to 7. And also, results of properties measured on the sample of Example 2 are shown in Table 8.

TABLE 2

| | Example 1 | Example 2 | Example 3 | Example 4 |
|---|---|---|---|---|
| $SiO_2$ | 50.24 | 49.72 | 48.68 | 48.16 |
| $Al_2O_3$ | 11.86 | 11.74 | 11.50 | 11.37 |
| MgO | 20.15 | 19.95 | 19.53 | 19.32 |
| $TiO_2$ | 7.50 | 7.42 | 7.27 | 7.19 |
| $K_2O$ | 3.00 | 4.00 | 6.00 | 7.00 |
| CaO | — | — | — | — |
| BaO | 6.72 | 6.65 | 6.51 | 6.45 |
| ZnO | 0.49 | 0.48 | 0.47 | 0.47 |
| $Sb_2O_3$ | 0.04 | 0.04 | 0.04 | 0.04 |
| BaO/(MgO + CaO + BaO) | 0.25 | 0.25 | 0.25 | 0.25 |
| Ceramming temperature (° C.) | 850 | 850 | 850 | 850 |
| Crystal phase | hexacelsian | hexacelsian | hexacelsian | hexacelsian |
| Secondary crystal phase | — | — | — | — |
| I(101)/I(110) | 1.3 | 0.8 | 0.0 | 0.0 |
| Polishing rate (μm/min.) | 0.3 | 0.4 | 0.5 | 0.4 |
| Thermal expansion coefficient (×10$^{-7}$/° C.) | 72 | 73 | 75 | 73 |
| Surface roughness (Å) | 2 | 2 | 3 | 1 |
| Grain size (nm) | 60 | 60 | 50 | 70 |
| Potassium eluted (μg) | 0.8 | 1.2 | 1.7 | 2.5 |
| Devitrification temperature (° C.) | 1290 | 1300 | 1320 | 1340 |
| Devitrification viscosity | 2.7 | 2.6 | 2.5 | 2.3 |

TABLE 3

| | Comparative Example 1 | Comparative Example 2 | Comparative Example 3 |
|---|---|---|---|
| $SiO_2$ | 51.79 | 51.27 | 73.42 |
| $Al_2O_3$ | 12.23 | 12.11 | 2.88 |
| MgO | 20.78 | 20.57 | — |
| $TiO_2$ | 7.73 | 7.65 | — |
| $K_2O$ | 0.00 | 1.00 | 1.75 |
| CaO | — | — | 19.25 ($Li_2O$) |
| BaO | 6.93 | 6.86 | 0.78 ($P_2O_5$) |
| ZnO | 0.50 | 0.50 | 1.88 (ZrO) |
| $Sb_2O_3$ | 0.04 | 0.04 | 0.04 |
| BaO/(MgO + CaO + BaO) | 0.25 | 0.25 | — |
| Ceramming temperature (° C.) | 850 | 850 | 760 |
| Crystal phase | enstatite | forsterite | lithium disilicate, cristobalite |
| I(101)/I(110) | — | — | — |
| Polishing rate (μm/min.) | <0.1 | <0.1 | 0.7 |
| Thermal expansion coefficient (×10$^{-7}$/° C.) | 55 | 56 | 78 |
| Surface roughness (Å) | 2 | 2 | 5 |
| Grain size (nm) | 50 | 60 | 250 |
| Potassium eluted (μg) | 0.0 | 0.7 | 1.2:lithium eluted 20 μg |
| Devitrification temperature (° C.) | 1310 | 1310 | — |
| Devitrification viscosity | 2.6 | 2.7 | measurement is impossible due to higher viscosity |

TABLE 4

|  | Example 5 | Example 6 | Comparative Example 4 | Comparative Example 5 |
|---|---|---|---|---|
| $SiO_2$ | 50.86 | 50.70 | 53.42 | 49.71 |
| $Al_2O_3$ | 12.01 | 11.97 | 12.61 | 11.74 |
| MgO | 20.41 | 13.56 | 21.43 | 6.65 |
| $TiO_2$ | 7.59 | 7.57 | 7.97 | 7.42 |
| $K_2O$ | 4.09 | 4.08 | 4.00 | 4.00 |
| CaO | 0.00 | 0.00 | — | — |
| BaO | 4.50 | 11.60 | — | 19.96 |
| ZnO | 0.49 | 0.49 | 0.52 | 0.48 |
| $Sb_2O_3$ | 0.04 | 0.04 | 0.04 | 0.04 |
| BaO/(MgO + CaO + BaO) | 0.18 | 0.46 | 0.0 | 0.75 |
| Ceramming temperature (° C.) | 850 | 850 | 850 | 850 |
| Crystal phase | hexacelsian | hexacelsian | enstatite | hexacelsian |
| I(101)/I(110) | 0.5 | 1.5 | — | 2.30 |
| Polishing rate (μm/min.) | 0.3 | 0.5 | <0.1 | 0.50 |
| Thermal expansion coefficient (×$10^{-7}$/° C.) | 72 | 83 | 58 | 92 |
| Surface roughness (Å) | 2 | 3 | 2 | 11 |
| Grain size (nm) | 50 | 90 | 60 | 700 |
| Potassium eluted (μg) | 1.1 | 1.5 | 0.9 | 7.7 |
| Devitrification temperature (° C.) | 1310 | 1330 | 1330 | 1350 |
| Devitrification viscosity | 2.5 | 2.4 | 2.3 | 2.2 |

TABLE 5

|  | Example 7 | Comparative Example 6 |
|---|---|---|
| $SiO_2$ | 49.72 | 49.72 |
| $Al_2O_3$ | 11.74 | 11.74 |
| MgO | 19.95 | 19.95 |
| $TiO_2$ | 7.42 | 7.42 |
| $K_2O$ | 4.00 | 4.00 |
| CaO | — | — |
| BaO | 6.65 | 6.65 |
| ZnO | 0.48 | 0.48 |
| $Sb_2O_3$ | 0.04 | 0.04 |
| BaO/(MgO + CaO + BaO) | 0.25 | 0.25 |
| Ceramming temperature (° C.) | 880 | 780 |
| Crystal phase | hexacelsian |  |
| I(101)/I(110) | 0.9 | — |
| Polishing rate (μm/min.) | 0.3 | 0.7 |
| Thermal expansion coefficient (×$10^{-7}$/° C.) | 74 | 55 |
| Surface roughness (Å) | 3 | 2 |
| Grain size (nm) | 80 | — |
| Potassium eluted (μg) | 1.3 | 1.0 |
| Devitrification temperature (° C.) | 1300 | 1300 |
| Devitrification viscosity | 2.6 | 2.6 |

TABLE 6

|  | Example 8 | Example 9 | Example 10 |
|---|---|---|---|
| $SiO_2$ | 49.96 | 56.55 | 49.91 |
| $Al_2O_3$ | 11.80 | 7.53 | 14.25 |
| MgO | 16.04 | 16.93 | 15.50 |
| $TiO_2$ | 7.46 | 7.66 | 6.45 |
| $K_2O$ | 4.02 | 4.02 | 3.51 |
| CaO | 5.35 | — | — |
| BaO | 5.35 | 7.26 | 10.34 |
| ZnO | — | — | — |
| $Sb_2O_3$ | 0.04 | 0.04 | 0.04 |
| BaO/(MgO + CaO + BaO) | 0.20 | 0.30 | 0.40 |
| Ceramming temperature (° C.) | 850 | 850 | 850 |
| Crystal phase | hexacelsian | hexacelsian | hexacelsian |
| Secondary crystal phase | diopside | enstatite | — |
| I(101)/I(110) | 0.5 | 0.3 | 0.6 |
| Polishing rate (μm/min.) | 0.5 | 0.3 | 0.6 |
| Thermal expansion coefficient (×$10^{-7}$/° C.) | 72 | 68 | 78 |
| Surface roughness (Å) | 2 | 2 | 3 |
| Grain size (nm) | 60 | 60 | 80 |
| Potassium eluted (μg) | 1.3 | 1.4 | 0.9 |
| Devitrification temperature (° C.) | 1230 | 1290 | 1310 |
| Devitrification viscosity | 3.0 | 2.7 | 2.6 |

TABLE 7

|  | Example 11 | Comparative Example 7 | Comparative Example 8 |
|---|---|---|---|
| $SiO_2$ | 43.95 | 49.48 | 49.48 |
| $Al_2O_3$ | 12.67 | 7.07 | 13.68 |
| MgO | 19.81 | 29.28 | 19.81 |
| $TiO_2$ | 8.35 | 9.09 | 7.34 |
| $K_2O$ | 5.03 | — | 3.02 |
| CaO | 1.01 | — | 6.64 |
| BaO | 9.15 | 5.05 | — |
| ZnO | — | — | — |
| $Sb_2O_3$ | 0.04 | 0.04 | 0.04 |
| BaO/(MgO + CaO + BaO) | 0.31 | 0.15 | 0.0 |
| Ceramming temperature (° C.) | 850 | 850 | 850 |
| Crystal phase | hexacelsian | hexacelsian | diopside |
| Secondary crystal phase | — | enstatite | — |
| I(101)/I(110) | 0.2 | 2.2 | — |
| Polishing rate (μm/min.) | 0.5 | 0.1 | 0.2 |
| Thermal expansion coefficient (×$10^{-7}$/° C.) | 59 | 71 | 58 |
| Surface roughness (Å) | 3 | 2 | 2 |
| Grain size (nm) | 50 | 60 | 60 |
| Potassium eluted (μg) | 1.5 | 0.0 | 0.7 |
| Devitrification temperature (° C.) | 1350 | 1370 | 1210 |
| Devitrification viscosity | 2.3 | 2.2 | 3.1 |

TABLE 8

|  | Properties of Example 2 |
|---|---|
| Glass transition point (° C.) | 730 |
| Density (g/cm³) | 3.04 |
| Bending strength (MPa) | 174 |
| Young's modulus (GPa) | 85 |
| Vickers hardness (kgf/mm²) | 700 |
| Fracture toughness ($MPa_{m1/2}$) | 0.90 |

Relation Between Addition Amount of $K_2O$ and I(101)/I(110) Ratio

When a diffraction intensity of (101) face is I(101) and a diffraction intensity of (110) face is I(110), a change of I(101)/I(110) through the addition of $K_2O$ is shown in Examples 1 to 4 and Comparative Examples 1 and 2. In Comparative Example 3 are shown data of lithium disilicate glass-ceramic as a typical material for a magnetic disk substrate. And also, X-ray diffraction charts of Examples 1 to 3 and Comparative Example 7 are shown in FIG. 1.

It can be seen that as the amount of $K_2O$ added increases, a ratio of a peak from (110) face at 2θ=about 33.8° becomes larger. In Comparative Examples 1 and 2, when the amount of $K_2O$ added is not more than 1 mol %, enstatite and forsterite precipitate and hexacelsian does not precipitate, and hence the polishing rate is low and the thermal expansion coefficient becomes low.

In Examples 1 to 4, as the amount of $K_2O$ added increases, hexacelsian precipitates and the ratio of $I(101)/I(110)$ becomes small. At the same time, the polishing rate increases and becomes equal to that of the lithium disiloicate glass-ceramic. However, the amount of alkali eluted increases as the amount of $K_2O$ added increases. Since lithium is not substantially included, there is no elution of lithium. From Example 4, it is considered that the elution of potassium exceeding a level of the lithium disilicate glass-ceramic is unfavorable as a magnetic disk. From these facts, the amount of $K_2O$ added is preferably 2–6 mol %, more particularly 3–5 mol %. In this case, the ratio of $I(101)/I(110)$ is $0 \leq I(101)/I(110) \leq 1.5$.

Relation Between Addition Amount of BaO and Surface State

Figure 2:
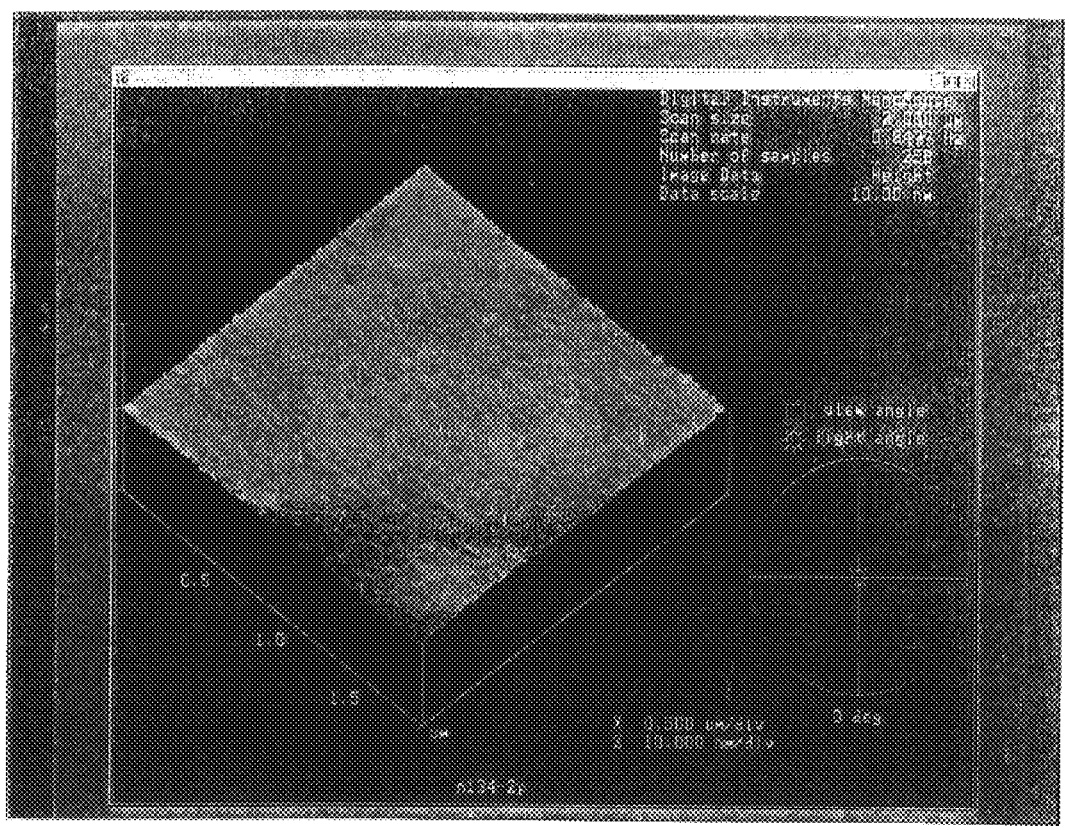
FIG. 2 is an atomic force micrograph (AFM) of a sample of Comparative Example 4.
Figure 3:
FIG. 3 is a transmission electron micrograph of a sample of Example 2.
Figure 4:
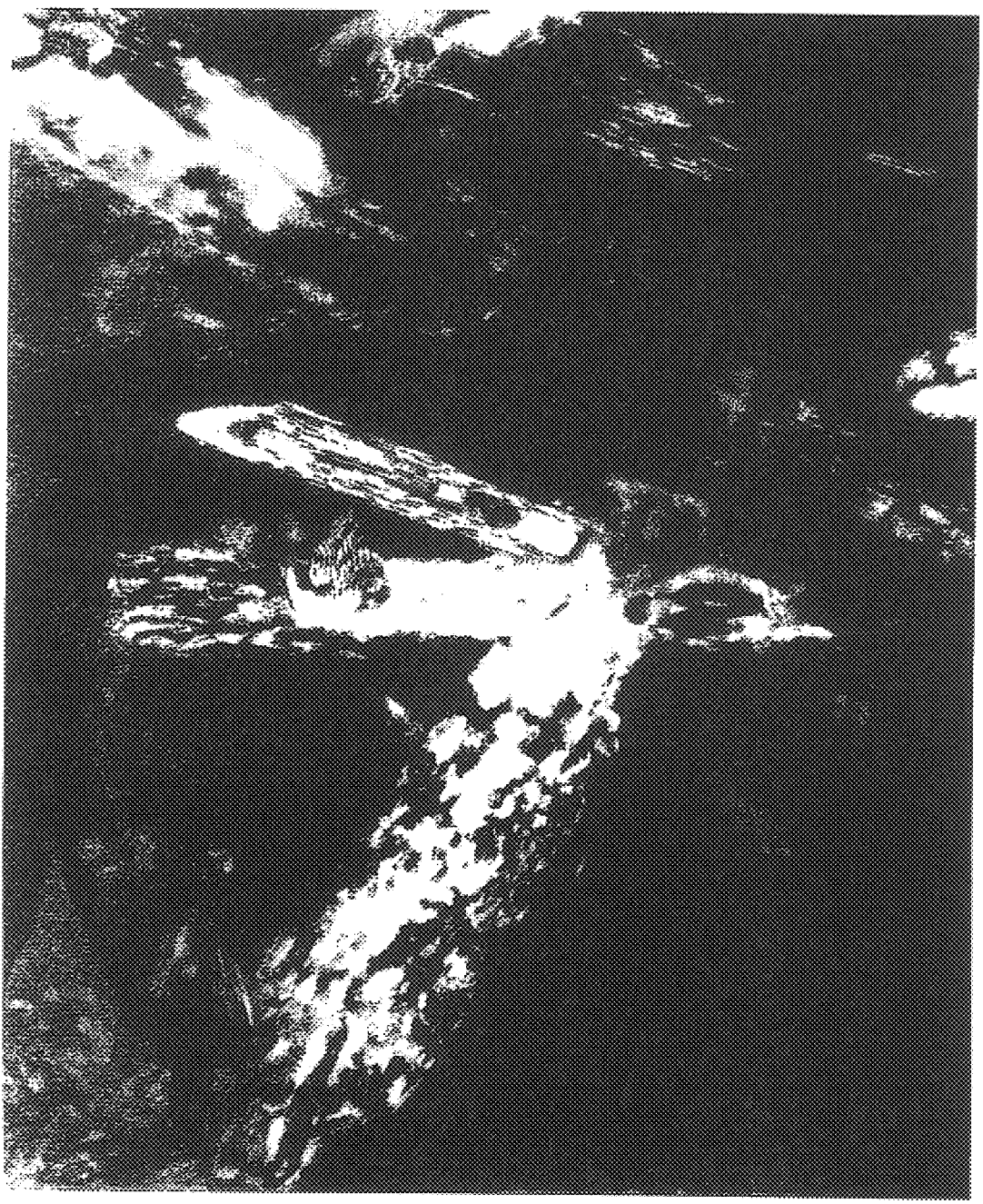
FIG. 4 is a transmission electron micrograph of a sample of Comparative Example 5.

It can be seen from Examples 5 to 6 and Comparative Examples 4 to 5 that as the ratio of Ba in alkaline earth metals ($BaO/(MgO+CaO+BaO)$) changes, the surface state changes. And also, as the amount of BaO added increases, $I(101)/I(110)$ increases. If BaO is not existent, hexacelsian does not precipitate, and enstatite and forsterite precipitate, and hence the polishing rate becomes small and the thermal expansion coefficient becomes low. From a viewpoint that the polishing rate and thermal expansion coefficient are further increased, $BaO/(MgO+CaO+BaO)$ is favorable to be not less than 0.2. In FIG. 2 is shown an atomic force micrograph (AFM) of a sample of Comparative Example 4, from which it is clear that when crystals of these metals are precipitated, holes are observed on the surface after the polishing and badly affect the surface roughness. And also, when $BaO/(MgO+CaO+BaO)$ is more than 0.5, the grain size becomes larger and the surface tends to be coarse. In this connection, transmission electron micrographs of Example 2 and Comparative Example 5 are shown in FIGS. 3 and 4, respectively. Therefore, in order to obtain the grain size of not more than 100 nm, $BaO/(MgO+CaO+BaO)$ is more preferable to be not more than 0.5.

Effect of Ceramming Temperature

In Example 7 and Comparative Example 6 are shown results when the precursor glass having the composition of Example 2 is treated at different ceramming temperatures. As seen from Comparative Example 6, when the heat treatment is carried out at 780° C., hexacelsian does not precipitate and the thermal expansion coefficient becomes low. On the other hand, as seen from Example 7, when the heat treatment is carried out at 880° C., the ratio $I(101)/I(110)$ and thermal expansion coefficient hardly change and the polishing rate tends to become somewhat lower. As a result, the heat treatment should be carried out at 800–900° C., preferably 830–870° C. for the application as a magnetic disk.

In the glass-ceramics according to the invention, the thermal expansion coefficient within a range of −40° C. to 70° C. can be made to be $60–90 \times 10^{-7}/°$ C., preferably $70–80 \times 10^{-7}/°$ C.

As seen from the composition ranges of Examples 1 to 11 and Comparative Examples 1 to 8, the amount of $SiO_2$ is preferably 43–57 mol %, more preferably 45–55 mol % (from Examples 9, 11), and the amount of $Al_2O_3$ is preferably 7–15 mol %, more preferably 8–14 mol % (from Examples 9, 10), and the amount of MgO is preferably 13–21 mol %, more preferably 14–20 mol % (from Examples 5, 6), and the amount of CaO is preferably 0–6 mol % (from Example 8 and Comparative Example 8), and the amount of BaO is preferably 4–12 mol %, more preferably 5–11 mol % (from Examples 5, 6), and the amount of $K_2O$ is preferably 2–6 mol %, more preferably 3–5 mol % (from Examples 1–4 and Comparative Examples 1, 2, 7), and the amount of $TiO_2$ is preferably 5–9 mol %, more preferably 6–8 mol % (from Example 10 and Comparative Example 7).

Embodiment of Controlling Devitrification Temperature and Devitrification Viscosity of Glass-Ceramic Various glass-ceramics of Examples 11–19 are prepared in the same manner as in Example 1. In this case, the compositions of precursor glasses used for these glass-ceramics are shown in Tables 9 and 10. Each numerical value in Tables 9 and 10 indicates mol % of each metal oxide. Although the basic composition in the glass-ceramics of Examples 11–19 is within the range defined in the invention, the influence of $(CaO+B_2O_3+P_2O_5+Bi_2O_5)$ upon the devitrification temperature and devitrification viscosity is examined by properly adding CaO, $B_2O_3$, $P_2O_5$ and $Bi_2O_5$ so as to change $(CaO+B_2O_3+P_2O_5+Bi_2O_5)$ within a range of 0.00 to 5.53 mol %. The measured results of these properties in Examples 12–19 are shown in Tables 11 and 12.

TABLE 9

| | Example 12 | Example 13 | Example 14 | Example 15 |
|---|---|---|---|---|
| $SiO_2$ | 48.27 | 48.74 | 50.82 | 48.15 |
| $Al_2O_3$ | 11.40 | 11.51 | 8.46 | 11.37 |
| MgO | 18.07 | 18.25 | 17.79 | 18.03 |
| $TiO_2$ | 7.21 | 7.28 | 7.15 | 7.19 |
| $K_2O$ | 3.88 | 3.92 | 3.85 | 3.87 |
| CaO | — | — | — | — |
| BaO | 7.75 | 7.83 | 7.58 | 7.73 |
| ZnO | 0.47 | 0.47 | 0.47 | 0.47 |
| $Sb_2O_3$ | 0.04 | 0.04 | 0.04 | 0.04 |
| $B_2O_3$ | — | 1.96 | 3.85 | 0.40 |
| $P_2O_5$ | 2.53 | — | — | 0.63 |
| $Bi_2O_5$ | 0.39 | — | — | 2.13 |
| $BaO/(MgO + CaO + BaO)$ | 0.30 | 0.30 | 0.30 | 0.30 |
| $CaO + B_2O_3 + P_2O_5 + Bi_2O_5$ | 2.92 | 1.96 | 3.85 | 3.16 |

TABLE 10

| | Example 16 | Example 17 | Example 18 | Example 19 |
|---|---|---|---|---|
| $SiO_2$ | 48.98 | 49.86 | 49.96 | 53.00 |
| $Al_2O_3$ | 11.57 | 11.77 | 11.80 | 8.83 |
| MgO | 18.34 | 16.00 | 18.70 | 18.55 |
| $TiO_2$ | 7.31 | 7.44 | 7.46 | 7.45 |
| $K_2O$ | 3.94 | 4.01 | 4.02 | 4.01 |
| CaO | — | 5.33 | — | 0.10 |
| BaO | 7.87 | 5.33 | 8.02 | 7.91 |
| ZnO | 0.47 | — | — | — |
| $Sb_2O_3$ | 0.04 | 0.04 | 0.04 | 0.04 |
| $B_2O_3$ | 0.99 | — | — | — |
| $P_2O_5$ | 0.49 | 0.20 | — | 0.10 |
| $Bi_2O_5$ | — | — | — | — |
| $BaO/(MgO + CaO + BaO)$ | 0.30 | 0.20 | 0.30 | 0.30 |
| $CaO + B_2O_3 + P_2O_5 + Bi_2O_5$ | 1.48 | 5.53 | 0.00 | 0.20 |

TABLE 11

|  | Example 12 | Example 13 | Example 14 | Example 15 |
|---|---|---|---|---|
| Ceramming temperature (° C.) | 850 | 850 | 850 | 850 |
| Crystal phase | hexa-celsian | hexa-celsian | hexa-celsian | hexa-celsian |
| Secondary crystal phase | — | — | — | — |
| I(101)/I(110) | 0.8 | 0.9 | 1.1 | 0.7 |
| Polishing rate (μm/min.) | 0.3 | 0.4 | 0.5 | 0.4 |
| Thermal expansion coefficient ($\times 10^{-7}$/° C.) | 75 | 74 | 75 | 72 |
| Surface roughness (Å) | 2 | 2 | 3 | 1 |
| Grain size (nm) | 60 | 60 | 80 | 50 |
| Devitrification temperature (° C.) | 1260 | 1230 | 1130 | 1240 |
| Devitrification viscosity | 2.8 | 2.9 | 3.4 | 3.0 |

TABLE 12

|  | Example 16 | Example 17 | Example 18 | Example 19 |
|---|---|---|---|---|
| Ceramming temperature (° C.) | 850 | 850 | 850 | 850 |
| Crystal phase | hexa-celsian | hexa-celsian | hexa-celsian | hexa-celsian |
| Secondary crystal phase | — | diopside | — | — |
| I(101)/I(110) | 0.8 | 1.3 | 0.7 | 0.7 |
| Polishing rate (μm/min.) | 0.4 | 0.3 | 0.4 | 0.3 |
| Thermal expansion coefficient ($\times 10^{-7}$/° C.) | 75 | 68 | 73 | 77 |
| Surface roughness (Å) | 2 | 3 | 1 | 2 |
| Grain size (nm) | 60 | 90 | 60 | 70 |
| Devitrification temperature (° C.) | 1230 | 1220 | 1300 | 1290 |
| Devitrification viscosity | 3.1 | 3.0 | 2.5 | 2.7 |

Figure 5:
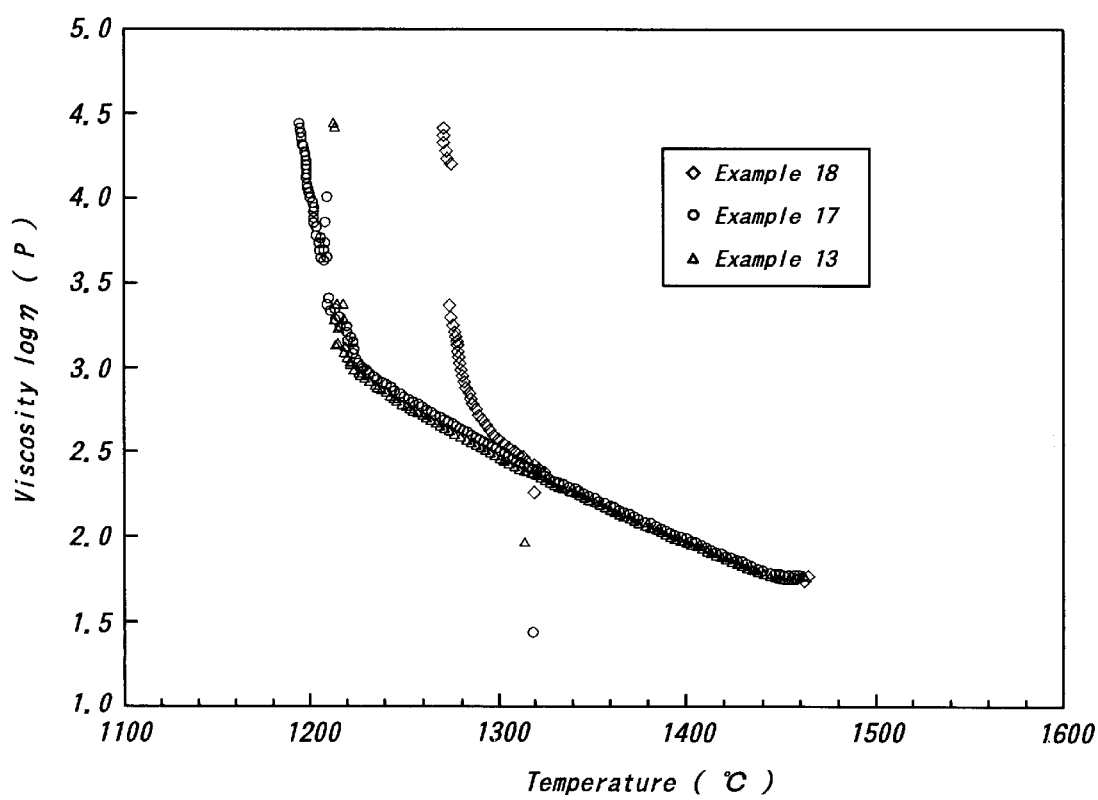
FIG. 5 is a graph showing a relation between temperature and viscosity after the melting of each precursor glass of Examples 13, 17 and 18.

With respect to Examples 13, 17 and 18, the change in the viscosity log η (poise) of the melt during the temperature dropping is shown in FIG. 5.

In all of Examples 12–19, the polishing rate is large and the surface roughness is small. In Example 18 having ($CaO+B_2O_3+P_2O_5+Bi_2O_5$) of 0.00 mol %, the devitrification temperature is 1300° C. and the devitrification viscosity is 2.5, while in Example 19 having ($CaO+B_2O_3+P_2O_5+Bi_2O_5$) of 0.20 mol %, the devitrification temperature is 1290° C. and the devitrification viscosity is 2.7.

On the other hand, in Examples 12–17 having ($CaO+B_2O_3+P_2O_5+Bi_2O_5$) of 0.3–6 mol %, the devitrification temperature is remarkably reduced to not higher than 1260° C. and also the devitrification viscosity is increased to not less than 2.8.

Glass-ceramics of Examples 20 and 21 are prepared by changing the glass composition as shown in Table 13 and the same measurements as mentioned above are carried out to obtain results as shown in Table 14.

TABLE 13

|  | Example 20 | Example 21 |
|---|---|---|
| $SiO_2$ | 47.13 | 46.08 |
| $Al_2O_3$ | 11.13 | 10.88 |
| MgO | 17.64 | 16.51 |
| $TiO_2$ | 7.04 | 6.88 |
| $K_2O$ | 3.79 | 3.71 |
| CaO | — | 2.04 |
| BaO | 7.57 | 8.13 |
| ZnO | 0.46 | 0.46 |
| $Sb_2O_3$ | 0.04 | 0.04 |
| $B_2O_3$ | — | — |
| $P_2O_5$ | 5.21 | 0.19 |
| $Bi_2O_5$ | — | 5.10 |
| BaO/(MgO + CaO + BaO) | 0.30 | 0.30 |
| $CaO + B_2O_3 + P_2O_5 + Bi_2O_5$ | 5.21 | 7.33 |

TABLE 14

|  | Example 20 | Example 21 |
|---|---|---|
| Ceramming temperature (° C.) | 850 | 850 |
| Crystal phase | hexacelsian | hexacelsian |
| Secondary crystal phase | — | — |
| I(101)/I(110) | 0.8 | 1.2 |
| Thermal expansion coefficient ($\times 10^{-7}$/° C.) | 77 | 75 |
| Surface roughness (Å) | 3 | 3 |
| Grain size (nm) | 90 | 80 |
| Devitrification temperature (° C.) | 1240 | 1260 |
| Devitrification viscosity | 3.1 | 3.0 |

In Example 20, since the amount of phosphorus pentoxide is as large as 5.21 mol %, the crystal grain size becomes large and the surface roughness tends to somewhat increase though the devitrification temperature is low.

In Example 21, since ($CaO+B_2O_3+P_2O_5+Bi_2O_5$) is large, the crystal grain size becomes large and the surface roughness tends to somewhat increase though the devitrification temperature is low.

As mentioned above, according to the invention, there can be provided glass-ceramics having hexacelsian of a high weather resistance as a primary crystal phase which are high in the polishing rate and are possible to polish at a sufficiently practical rate with abrasive grains usually used in industry such as cerium oxide and the like.

What is claimed is:

1. A glass-ceramic comprising a hexacelsian primary crystal phase satisfying a relation of $0 \leq I(101)/I(110) \leq 1.5$ when a diffraction intensity of a (101) face of said hexacelsian in an X-ray diffraction is I(101) and a diffraction intensity of a (110) face thereof is I(110).

2. A glass-ceramic comprising a hexacelsian as a primary crystal phase, satisfying a relation of $0 \leq (101)/I(110) \leq 1.5$ when a diffraction intensity of (101) face of hexacelsian in an X-ray diffraction is I(101) and a diffraction intensity of (110) face thereof is I(110), wherein said glass-ceramic is obtained by ceramming a precursor glass comprising 43–57 mol % of $SiO_2$, 7–15 mol % of $Al_2O_3$, 13–21 mol % of MgO, 4–12 mol % of BaO, 2–6 mol % of $K_2O$ and 5–9 mol % of $TiO_2$ through a heat treatment.

3. A glass-ceramic comprising a cerammed precursor glass, said precursor glass comprising 43–57 mol % of $SiO_2$, 7–15 mol % of $Al_2O_3$, 13–21 mol % of MgO, 4–12 mol % of BaO, 2–6 mol % of $K_2O$ and 5–9 mol % of $TiO_2$ through a heat treatment.

4. A glass-ceramic according to claim 2, said glass-ceramic further comprising:

CaO: 0–6 mol %;

$B_2O_3$: 0–5 mol %;

$P_2O_5$: 0–5 mol %;

$Bi_2O_5$: 0–5 mol %; and ($CaO+B_2O_3+P_2O_3+P_2O_5+Bi_2O_5$): 0.3–6 mol %.

5. A glass-ceramic according to claim 2, wherein said precursor glass alter melting has a devitrification temperature of not higher than 1280° C. and a devitrification viscosity log η (poise) of not less than 2.8.

6. A glass-ceramic according to claim 5, wherein said precursor glass is shaped by a direct press method.

7. A glass-ceramic according to claim 2, wherein said precursor glass further comprises nor more than 6 mol % of CaO.

8. A glass-ceramic according to claim 7, wherein said precursor glass satisfies a relationship of $0.2 \leqq BaO/(MgO+CaO+BaO) \leqq 0.5$ (mol %).

9. A glass-ceramic according to claim 2, wherein said precursor glass is cerammed at 800–900° C.

10. A glass-ceramic according to claim 1, wherein a size of crystal grains precipitated in said glass-ceramic is not more than 100 nm.

11. A glass-ceramic according to claim 1, wherein said glass-ceramic has a thermal expansion coefficient within a range of −40° C. to 70° C. of $60$–$90 \times 10^{-7}$/° C.

12. A magnetic disk substrate comprising said glass-ceramic of claim 1.

13. A magnetic disk substrate according to claim 12, wherein a surface of said substrate is polished with cerium oxide.

14. A magnetic disk substrate according to claim 12, wherein said surface has a center-line average surface roughness Ra of not more than 0.3 nm.

15. A magnetic disk comprising said magnetic disk substrate of claim 12, further comprising an undercoat fanned on a smooth surface of said substrate and a metal magnetic layer formed on said undercoat.

* * * * *

UNITED STATES PATENT AND TRADEMARK OFFICE
CERTIFICATE OF CORRECTION

PATENT NO. : 6,589,893 B2
DATED : July 8, 2003
INVENTOR(S) : Masahiro Abe et al.

It is certified that error appears in the above-identified patent and that said Letters Patent is hereby corrected as shown below:

Column 1,
Line 22, please delete "a" (first occurrence)
Line 23, please delete "the"
Line 40, please delete ","
Line 41, please delete "is too low in"
Line 41, please add -- is too low -- after "rate"
Line 43, please delete "(that is,"
Line 44, please delete ")"
Line 65, please delete "there is the"
Line 66, please delete "provision of"
Line 66, please add -- is provided -- after "glass-ceramic"

Column 2,
Line 4, please delete "there is the"
Line 5, please delete "provision of"
Line 5, please add -- is provided, -- after "glass-ceramic"
Lines 10-11, please delete "there is the provision of"
Line 12, please add -- is provided -- after "glass-ceramic"
Line 42, please change "examination on" to -- the examination of --
Line 45, please delete "a"
Line 66, please add -- the -- after "to"
Line 67, please add -- the -- after "in"

Column 3,
Line 4, please change "owing to the growth of" to -- due to the growth of an --
Line 21, please change "5,910,459 are shown" to -- 5,910,459, --
Line 23, please add -- are shown -- after "phase"
Line 65, please delete "there can be adopted"
Line 67, please add -- can be adopted -- after "substrate"

Column 4,
Line 3, please change "as" to -- a --
Line 46, please change "is included and a" to -- are included and the --
Line 47, please change "made to" to -- in a range of --

UNITED STATES PATENT AND TRADEMARK OFFICE
CERTIFICATE OF CORRECTION

PATENT NO.    : 6,589,893 B2
DATED         : July 8, 2003
INVENTOR(S)   : Masahiro Abe et al.

It is certified that error appears in the above-identified patent and that said Letters Patent is hereby corrected as shown below:

<u>Column 5,</u>
Line 65, please add -- sandwiched between carbon sheets of 5mm in thickness and -- after "is"
Lines 65-67, please delete "at a state of sandwiching between carbon sheets of 5 mm in thickness".

<u>Column 6,</u>
Line 2, please add -- , -- after "hours"

<u>Column 11,</u>
Line 44, please delete "In"
Line 44, please change "are shown" to -- show the --

Signed and Sealed this

Seventh Day of October, 2003

JAMES E. ROGAN
*Director of the United States Patent and Trademark Office*